July 5, 1927.
A. F. HOEGG
1,635,124
LATERAL MOTION BEARING FOR JOURNAL BOXES
Filed Nov. 1, 1926  2 Sheets-Sheet 2
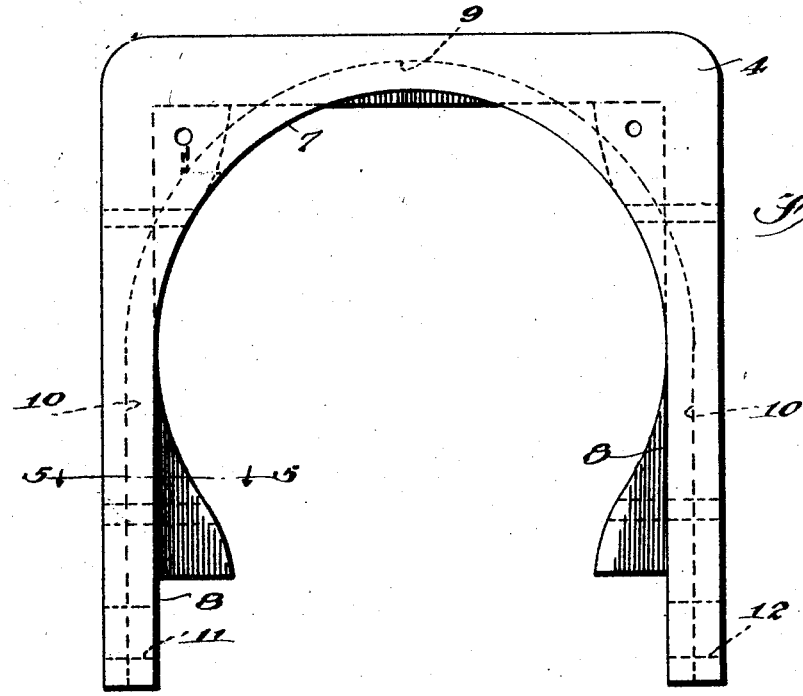
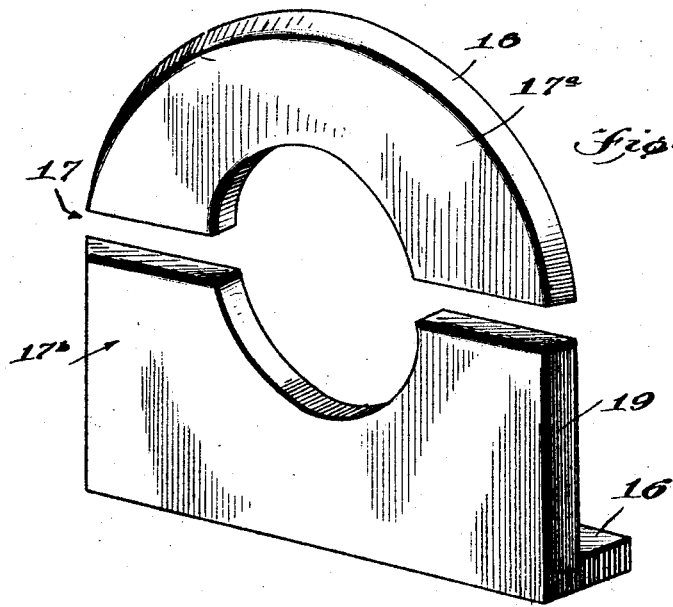
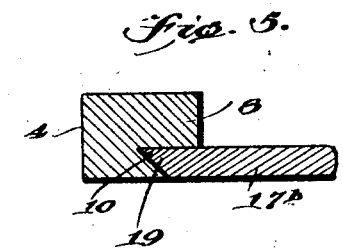
INVENTOR
A. F. Hoegg,
BY
ATTORNEYS Patented July 5, 1927.

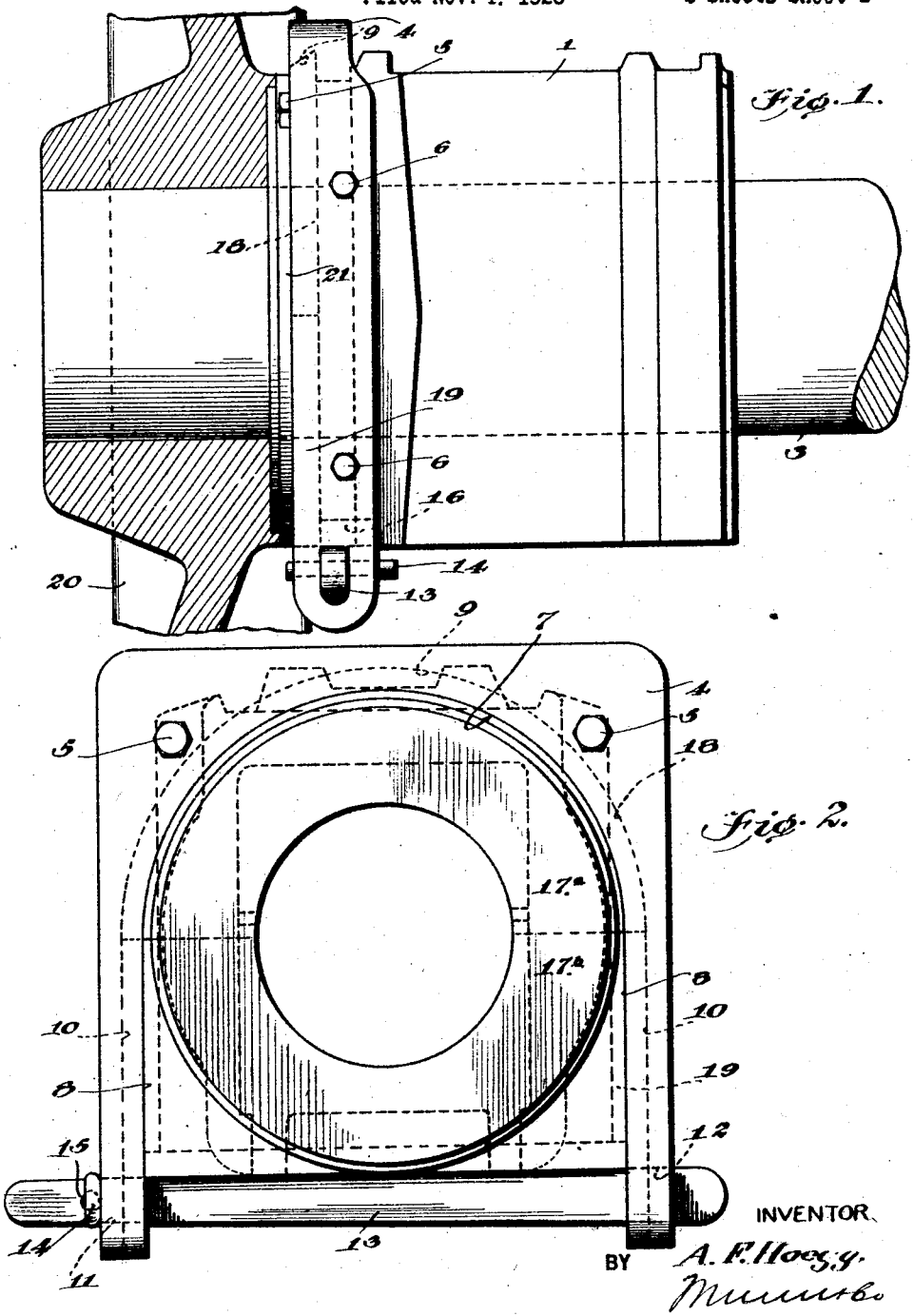

1,635,124

UNITED STATES PATENT OFFICE.

AUGUSTUS F. HOEGG, OF WEATHERLY, PENNSYLVANIA.

LATERAL-MOTION BEARING FOR JOURNAL BOXES.

Application filed November 1, 1926. Serial No. 145,629.

My invention relates generally to improvements in lateral motion bearings of the type particularly adapted for use in engine truck driving and trailer boxes and which consists in the combinations, constructions and arrangements herein described and claimed.

An object of the invention is the provision of a railway journal box which has means for supporting a removable lateral motion bearing of brass or other relatively soft material so that the wheel may turn without any appreciable friction and without excess lateral play, and the bearing can be replaced when worn, quickly and easily and at a relatively slight cost.

A further object of the invention is the provision in a journal box of the character described of a removable lateral motion bearing and a novel means for mounting the lateral motion bearing in its associated box so that the bearing can be removed when desired with but relatively little labor and in a relatively short time.

A still further object of the invention is the provision in a railway wheel and bearing assembly of means for supporting a liner so that the wear in service will be greater on the removable bearing of the associated journal box than on any other part of the bearing structure of the wheel.

Other objects and advantages of the invention will be apparent from the following description considered in conjunction with the accompanying drawings, in which:—

Figure 1 is a side elevation of a journal box in association with an axle and wheel, only fragmentary portions of the axle and wheel being shown, the journal box being equipped with a lateral motion bearing and its mounting according to the present invention, Figure 2 is an inner end view of the improved journal box, Figure 3 is an end view of a retaining frame member of a journal box which is used in carrying out the invention, Figure 4 is a perspective view of the members of a removable lateral motion bearing which is used in the particular embodiment of the invention, and Figure 5 is a section substantially along line 5—5 of Figure 3.

In carrying out the invention, I make use of a journal box having a body 1 of a conventional construction. The body 1 of the journal box is open at both ends as is usual for the reception of the journal portion 2 of an associated axle 3. In carrying out the invention, the body 1 of the journal box is provided for its open inner end with a substantially U-shaped retaining member 4 which may be disposed in inverted position as shown. The frame member 4 overlaps the edge portion of the body 1 of the journal box and is secured rigidly to the latter by the end cap bolts 5 and the side cap bolts 6. It is obvious that the retaining member 4 may be formed integrally with the body 1 of the journal box.

The space within the retaining member 4 at the edge of the body of the journal box has a substantially semi-circular top wall at 7 and parallel vertical side walls at 8. A retaining groove is formed in the inner wall of the retaining member 4 adjacent to the front edge of the inner wall of the retaining member 4, such groove having a top portion 9 that is formed in the part 7 of the inner wall of the retaining member and side portions 10 which are formed in the parts 8 of the inner wall of the retaining member 4 and which extend to the lower ends of the legs of the retaining member 4. The retaining groove 10—9—10 preferably tapers in width from its edge towards the bottom as best seen in Figures 1 and 5, being formed with its inner side wall disposed at right angles to the longitudinal axis of the body of the journal box and with its outer side wall disposed at an oblique angle with the longitudinal axis of the journal box body.

The legs of the frame member 4 extend below the level of the bottom of the journal box body and have slots 11 and 12 respectively, formed in their extending lower end portions. The slots 11 and 12 are in alignment transversely of the journal box and are located outwardly of the plane of the inner side wall of the retaining groove 10—9—10. The opening 12 is slightly larger than the opening 11 and decreases in height from its outer end towards the inner end while the opening 11 decreases in height from its inner end to its outer end. A tapering supporting key 13 is adapted to be projected through the openings 12 and 11 in turn and driven to position to extend across the space between the lower end portions of the legs of the retaining member 4 as shown in Fig. 2, with the end portions of the supporting key 13 extending laterally of opposite sides of the retaining member 4 and in frictional engagement with the walls of the openings 11 and 12, one end portion of the key 13 being too large to be projected completely through the opening 12. A cotter pin 14 may be disposed in a transverse opening 15 in the extending smaller end portion of the key 13 to prevent accidental displacement of the key 13. The key 13 is adapted to underlie an outwardly extending lateral flange 16 on a lateral motion bearing generally indicated at 17 which fits within the retaining frame 4. The lateral motion bearing 17 comprises two co-operative sections $17^a$ and $17^b$ respectively, both of which may be formed of brass or any other relatively soft material. The section $17^a$ has semi-circular parallel inner and outer walls and the outer edge portion thereof tapers in thickness as indicated at 18 to fit in the portion 10 of the aforesaid retaining groove. The section $17^b$ of the lateral motion bearing has an inner wall which is semi-circular and is complemental to the inner wall of the section $17^a$. The side edge portions of the section $17^b$ taper in width as indicated at 19 to fit in the portions 10 of the aforesaid retaining groove. The laterally turned flange 16 is formed at the lower edge of the section $17^b$ of the bearing member and is supported by the key 13. The section $17^a$ is supported by the section $17^b$ and the lateral motion bearing thus is retained in the frame member 4 so long as the key 13 is in place. The bearing member is adapted to rotatably support the bearing portion of the associated wheel and the wear that takes place because of the rotation of the wheel and the lateral stresses of the wheel will be on the bearing member 17. In order that such wear may be concentrated on the members $17^a$ and $17^b$, the usual relatively soft bearing liner of the hub of the associated wheel 20 on the axle 3 is replaced by a hardened steel liner 21. The bore that is defined by the members $17^a$ and $17^b$ is sufficiently large to prevent such members from coming into contact with the axle.

From the foregoing description of the various parts of the device the operation thereof may be readily understood. The lateral motion bearing can be removed quickly and easily without removal of the journal portion 2 from the body of the journal box by first removing the cotter pin 14 and driving the wedge key 13 out of the openings 11 and 12 to permit the lower section $17^b$ to be displaced in a downward direction. A suitable tool then can be placed against one end of the upper section $17^a$ and actuated to swing the upper section $17^a$ around the journal to a position underneath the journal after which the section $17^a$ of the bearing can be removed from the space between the legs of the lateral motion bearing retaining frame 4. The operation of replacing a new lateral motion bearing 17 and securing it in place in the frame 4, while the journal 2 is in place in the body of the journal box is thought to be obvious.

Obviously the invention is susceptible of embodiments and forms other than that which is illustrated in the accompanying drawings and I therefore consider as mine all such modifications and adaptations thereof as fairly fall within the scope of the appended claims.

I claim:—

1. In a journal box, a substantially U-shaped retaining member at the open end of the body of the journal box, a lateral motion bearing fitting in said retaining member, and a removable key extending across the end portions of the legs of the retaining member for preventing displacement of the said bearing member.

2. In a journal bearing assembly, a box having a body open at both ends for the reception of a journal member, a substantially U-shaped frame member at the edge of the inner open end of the body of said box, said frame member having a groove in its inner wall, a lateral motion bearing having an edge portion fitting in said groove and adapted for the reception of said lateral motion bearing member, and a removable supporting member spanning the end portions of the legs of the said U-shaped frame and supporting said bearing member within said frame.

3. In a journal bearing assembly, a box having a body open at both ends for the reception of a journal member, a substantially U-shaped frame member at the edge of the inner open end of the body of said box, said frame member having a groove in its inner wall, a lateral motion bearing having an edge portion fitting in said groove and adapted for the reception of said lateral motion bearing member, a removable supporting member spanning the end portions of the legs of the said U-shaped frame and supporting said bearing member within said frame, said bearing member comprising a section having semi-circular inner and outer walls and fitting in the bend portion of the U-shaped frame, and a complementary section having a semi-circular inner wall and fitting between the legs of said U-shaped frame, said second section of the bearing member resting upon said removable supporting member.

4. In a journal bearing assembly, a box having a body open at both ends for the reception of a journal member, a substantially U-shaped frame member at the edge of the inner open end of the body of said box, said frame member having a groove in its inner wall, a lateral motion bearing having an edge portion fitting in said groove, a removable supporting member spanning the end portions of the legs of the said U-shaped frame and supporting said bearing member within said frame, said bearing member comprising a section having semi-circular inner and outer walls and fitting in the bend portion of the U-shaped frame, and a complementary section having a semi-circular inner wall and fitting between the legs of said U-shaped frame, said second section of the bearing member resting upon said removable supporting member, said supporting member comprising a tapering key extending across the end portions of the legs of said U-shaped frame member and having end portions extending through transversely alined tapering openings in the end portions of the legs of the frame member.

5. In a bearing assembly for a journal member, a box having a body open at both ends, a substantially U-shaped frame member secured to the edge portion of the upper end of said body, said frame member having a groove in its inner wall lying in a plane extending at right angles with the axis of the body of the journal box, said groove decreasing in width from its edge to its bottom, the leg portions of said U-shaped frame member having alined tapering transverse openings, one of said openings being larger than the other, a sectional lateral motion bearing fitting in said substantially U-shaped frame member and having tapering edge portions fitting in the groove in the inner wall of said frame member, one of said bearing member sections having a laterally extending flange, and a tapering key adapted to be projected to position to extend through the openings in the legs of said frame member across the space between the legs of said frame member and underneath the flange of said one section of the bearing member for supporting the sections of the bearing member in place in the frame member.

6. In a bearing assembly for a journal member, a box having a body open at both ends, a substantially U-shaped frame member secured to the edge portion of the upper end of said body, said frame member having a groove in its inner wall lying in a plane extending at right angles with the axis of the body of the journal box, said groove decreasing in width from its edge of its bottom, the leg portions of said U-shaped frame member having alined tapering transverse openings, one of said openings being larger than the other, a sectional lateral motion bearing fitting in said substantially U-shaped frame member and having tapering edge portions fitting in the groove in the inner wall of the said frame member, one of said bearing member sections having a laterally extending flange, and a tapering key adapted to be projected to position to extend through the openings in the legs of said frame member and underneath the flange on said one section of the bearing member for supporting the sections of the bearing member in place in the frame member, said bearing member being formed of brass or other relatively soft material.

AUGUSTUS F. HOEGG.